Figure 1:
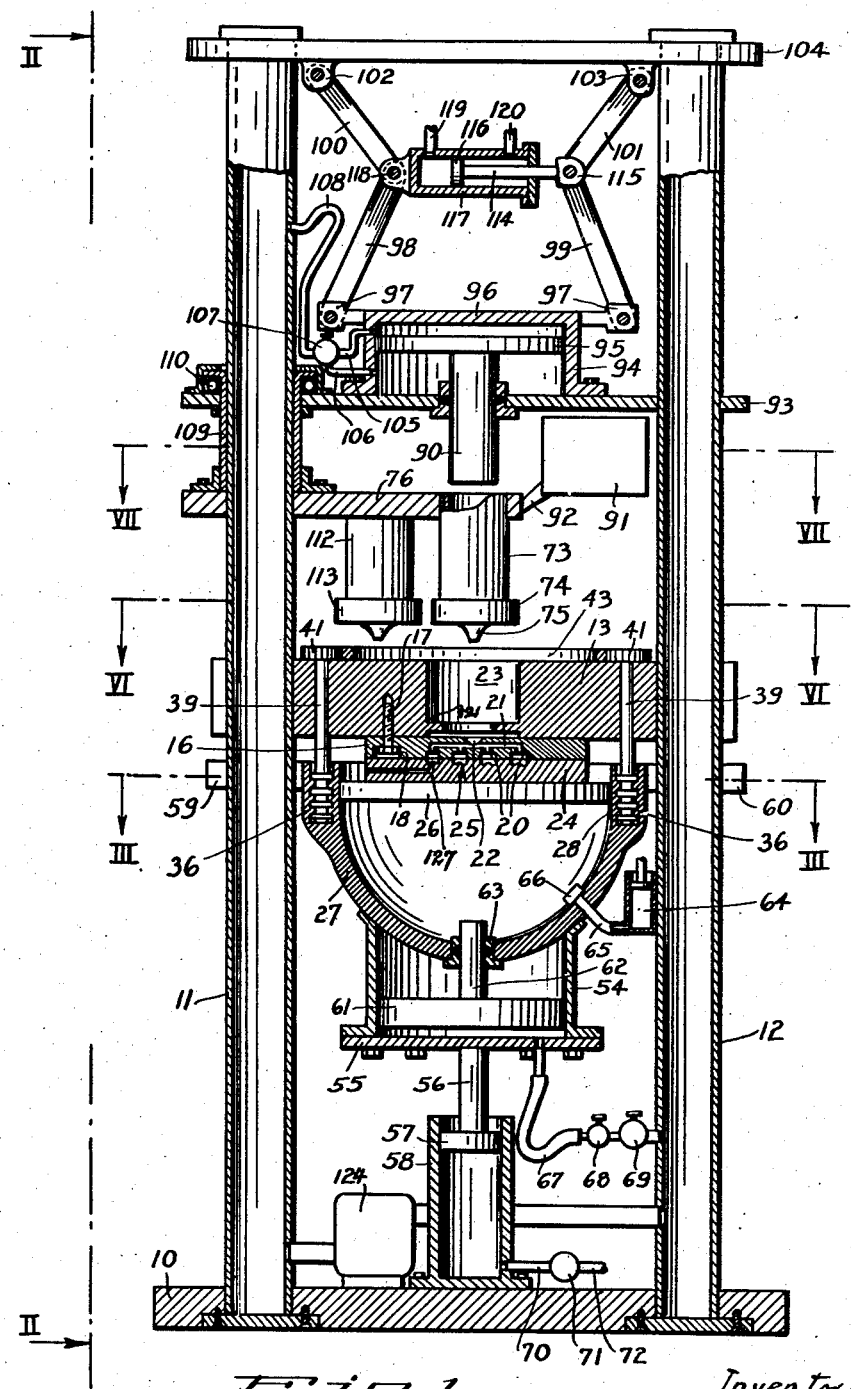

April 24, 1945.    F. VON OPEL    2,374,468
INJECTION MOLDING APPARATUS
Original Filed Dec. 21, 1940    6 Sheets-Sheet 1

Inventor:
FRITZ VON OPEL
By: J. O. Ollier, atty.

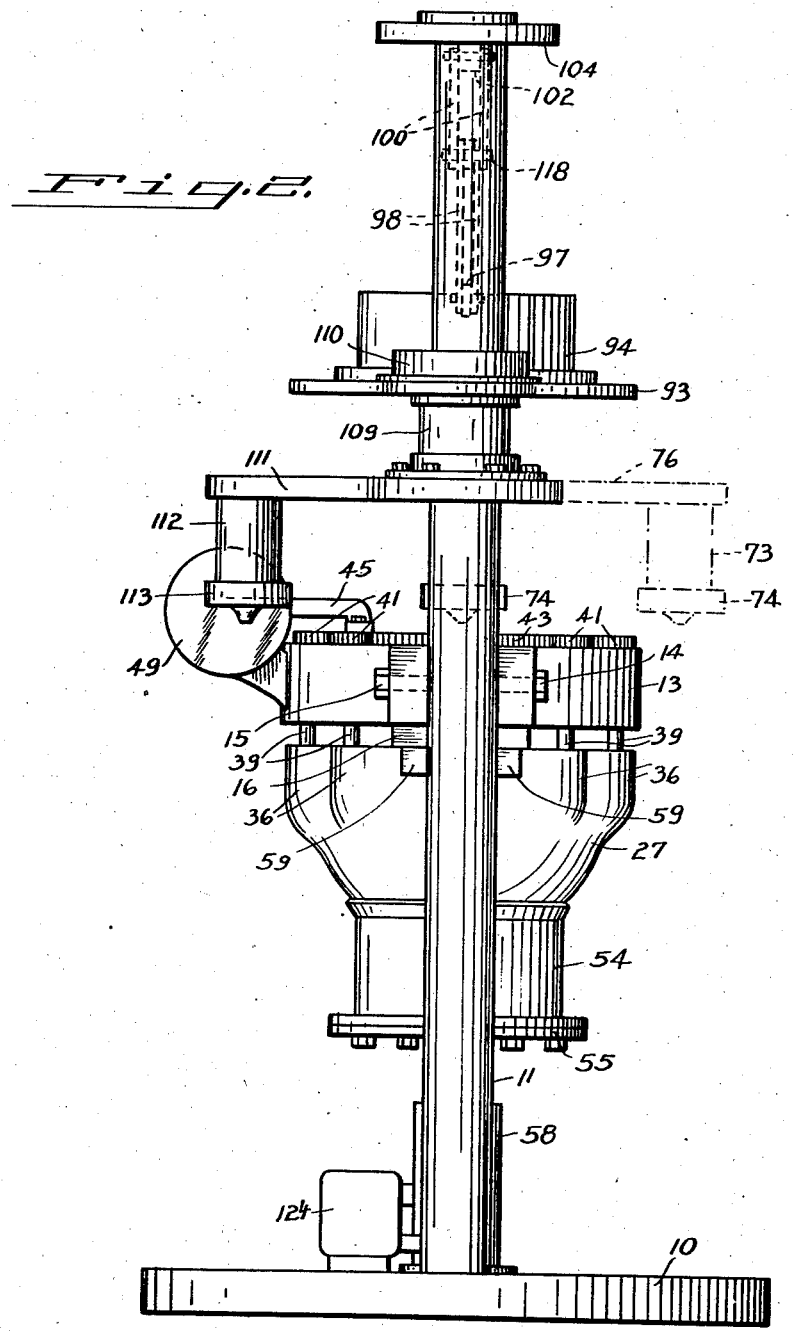

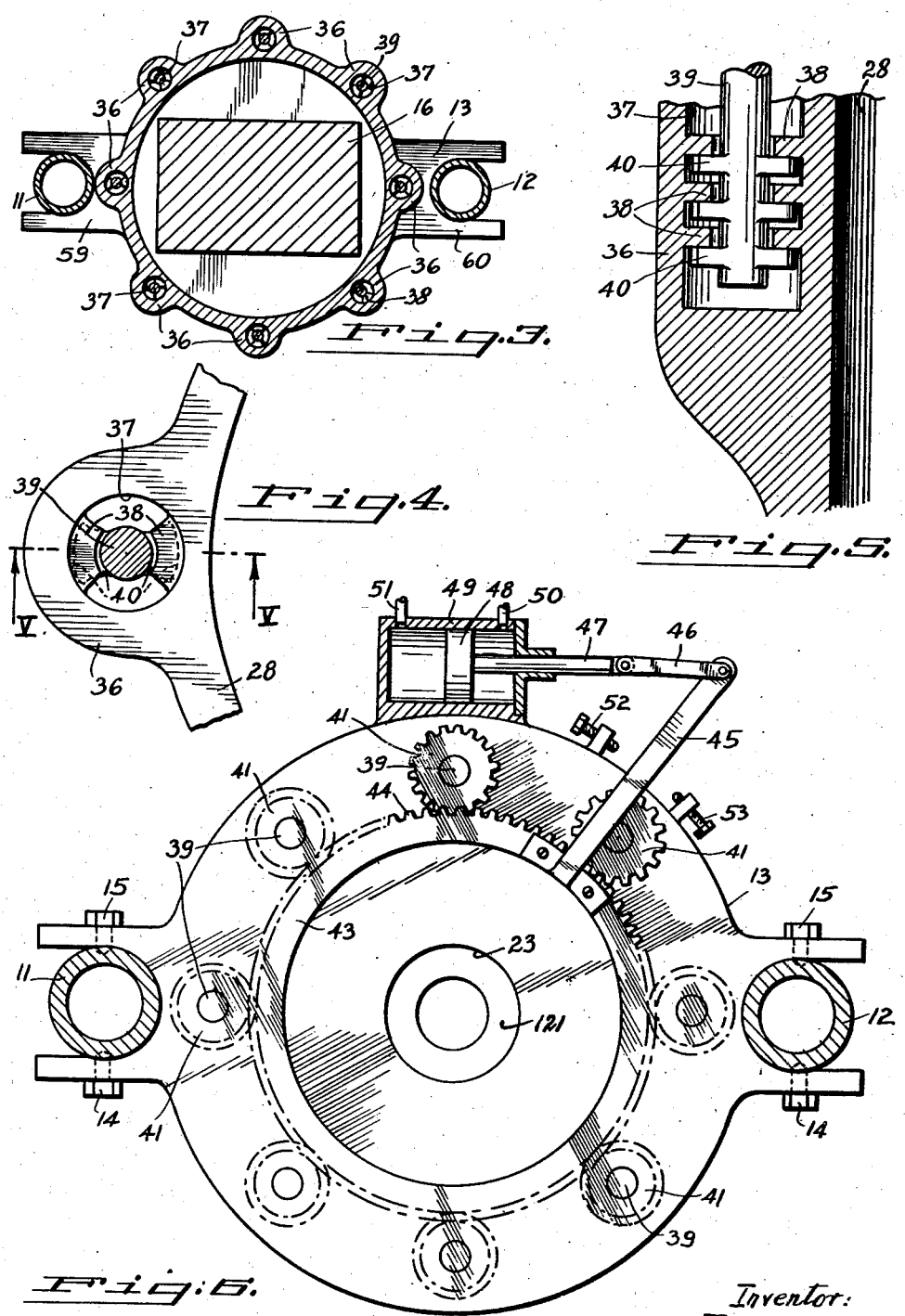

Inventor:
Fritz von Opel
By: J. O. Ollier, atty.

April 24, 1945.  F. VON OPEL  2,374,468
INJECTION MOLDING APPARATUS
Original Filed Dec. 21, 1940  6 Sheets-Sheet 5

Inventor:
FRITZ VON OPEL
by: J. O. Ollier,
atty.

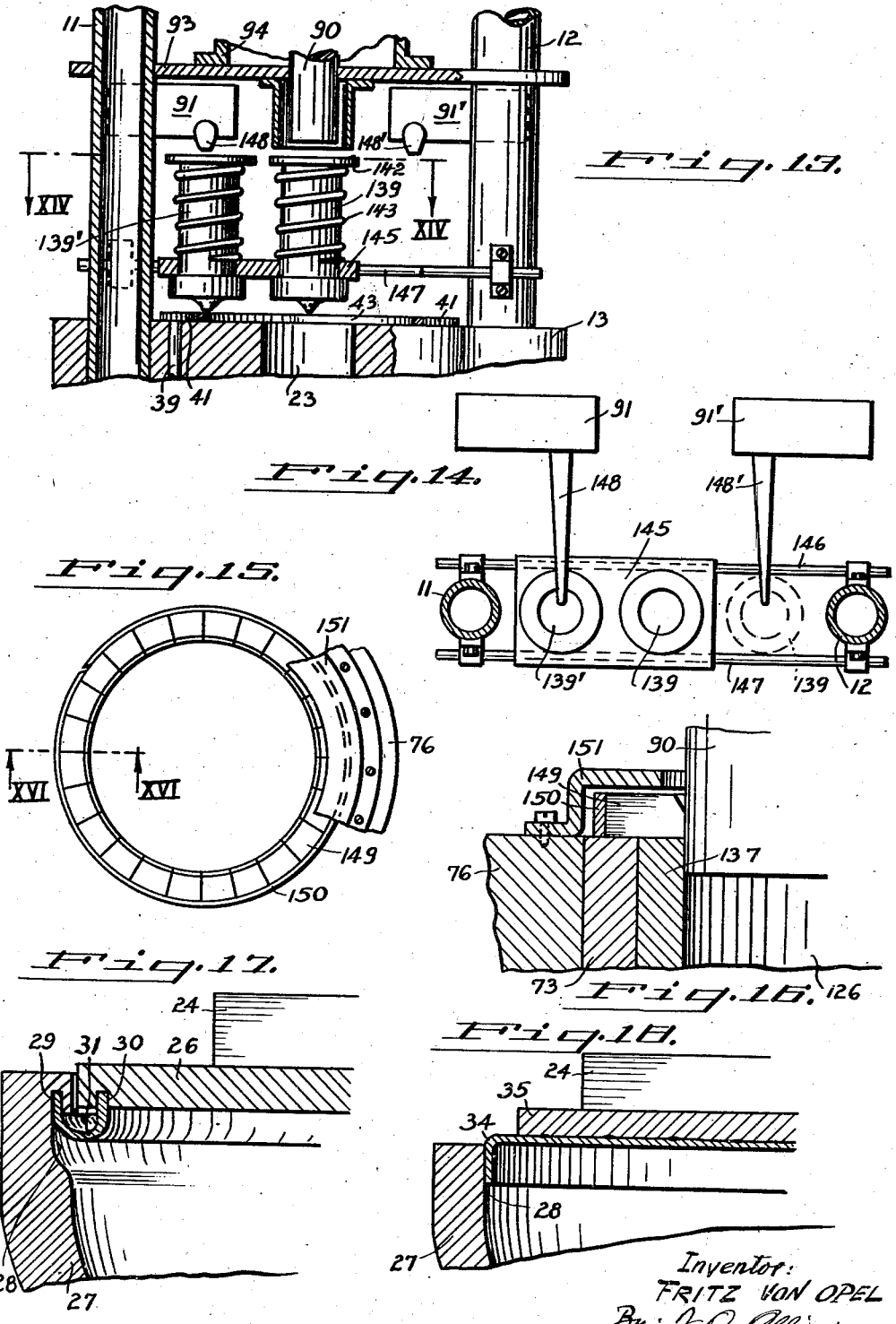

Patented Apr. 24, 1945

2,374,468

UNITED STATES PATENT OFFICE 2,374,468

INJECTION MOLDING APPARATUS

Fritz von Opel, New York, N. Y.; vested in the Alien Property Custodian

Original application December 21, 1940, Serial No. 371,188. Divided and this application August 5, 1941, Serial No. 405,458

6 Claims. (Cl. 18—30)

This invention relates to an apparatus for injection molding of plastic or plasticised material, and in particular of thermoplastic materials, such as cellulose acetates, polyvinyl and acrylate resins and polystyrenes.

This application is a division of my copending application Ser. No. 371,188, filed December 21, 1940.

In injection molding methods and apparatuses of this type, the material to be injected is plasticised, in one part of the machine or process, and injected under suitable pressure into mold cavities formed in two plates or sections facing each other. One of these sections is removably mounted on a stationary clamping plate which is rigidly connected with a cylinder in which the solid and preferably powdery initial moldable material is being heated to plasticising temperature. A reciprocating piston is arranged within that stationary cylinder and injects at its forward stroke the plasticised material through suitable channels into the mold cavities, while at its back stroke sufficient space is given to feed a preferably measured quantity of moldable material into the stationary cylinder.

The other one of the two sections provided with the mold cavities is removably mounted on a movable clamping plate; by reciprocating the latter plate, the mold is opened and closed. When closed, the plasticised material is injected into the cavities of the closed mold sections; when opened, the molded and solidified finished product can be removed or the mold sections exchanged.

For reciprocating the movable clamping plate, toggles, hydraulic or other power driven means, such as driven by an electro-motor, have been used; those means are to open the mold sufficiently for the purposes mentioned, and to close it. While the plasticised material is injected, it exerts pressure upon the mold cavities from within. Cleavages between the mold sections giving cause to flashes of the injected material occurred however with mechanical means for reciprocating the movable clamping plate with the mold section thereon, if the toggle-joints began to wear out during use. If hydraulic or other power means were used, they had to be dimensioned so that the mold sections were tightly pressed together and flashes prevented while pressure from within was exerted upon them, while the power needed for opening and closing the mold is considerably smaller. Even with such high power drives flashes could not always be avoided, and it was suggested to use additional means for locking the clamping plates in their closed position. To this effect power driven bolts provided with screw threads were connected with one of the clamping plates and engaged screw threaded nuts provided on the other clamping plate when the mold was closed. By turning those screw threaded bolts the clamping plates were pressed against each other and held so during the injection process proper. However, those screws were operated while the mold was closed and the cooperating surfaces of the screw threads on the bolts and of the nuts were turned while under high and still increasing pressure. This made them wear rather soon, and considerable power was needed to turn them in order to finally exert the desired clamping pressure.

With injection machines heretofore known, changing from one kind of material to another, in particular from one color to the other was quite difficult. The injection cylinder had to be cleaned thoroughly before a new kind of plasticised material could be used. According to the invention, the injection cylinder or at least part of it is made movable so that one cylinder can be replaced by another one during operation and even during one cycle of the machine.

It is therefore an object of the invention to increase the efficiency and reduce the cost of operating and maintaining such an apparatus.

It is a further object of the invention to shorten the time needed for each cycle.

It is a still further object of the invention to reduce the wear of the mechanism or power drive for the injection plunger.

It is a still further object of the invention to provide separate power means or mechanism for effecting the more idle portion of the stroke of the injection plunger and its power portion.

It is another object of the invention to reduce stresses in the frame structure caused by the injection pressure.

It is a still further object of the invention to reduce the amount of fluid to be moved under pressure and circulated for operating various parts of the machine.

It is a further object of the invention to reduce stresses in and wear of the machine, by adjusting the pressure in a fluid used to operate certain parts of the machine to individual requirements.

It is a still further object of the invention to facilitate change of material to be injected, in particular during a cycle of operation.

It is a still further object of the invention to arrange exchangeable cylinders, or parts thereof, for injecting under pressure the plasticized material while preferably a single injection plunger and in any case a single mechanism or power drive for actuating it is provided.

It is still a further object of the invention to provide exchangeable injection cylinders pressed against a clamping plate or mold section by another source of power than that which actuates the injection plunger of the machine.

It is another object of the invention to reduce the masses to be moved and the weight of the machine.

It is still a further object of the invention to improve the uniform heating of the material to be injected and to shorten the period of time needed for its plastification.

It is still another object of the invention to heat the material to plastification temperature and keep it plasticized without overheating and deteriorating it.

It is still a further object of the invention to improve the ejection means for the molded units, and thereby further to shorten the cycle of operation.

Figure 11:
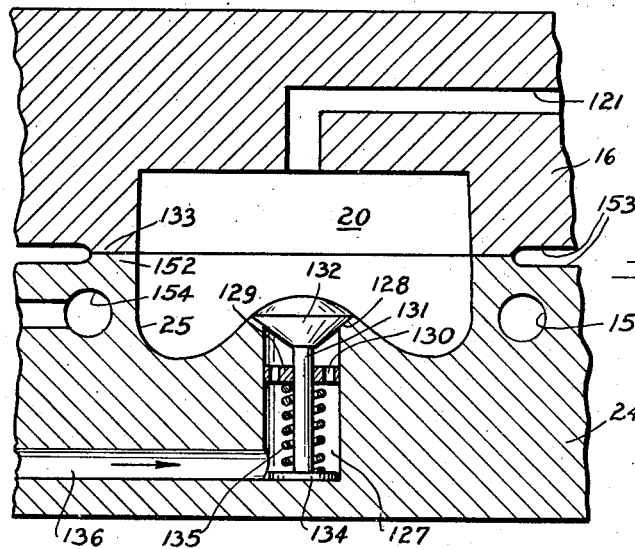

These and other objects of the invention will be more clearly understood when the specification proceeds with reference to the drawings in which by way of exemplification Fig. 1 shows a vertical cross section with parts in elevation, Fig. 2 is a side elevation; Fig. 3 is a horizontal section taken on the line III—III in Fig. 1; Fig. 4 is a fragmentary horizontal section taken on the line IV—IV in Fig. 1; Fig. 5 is a vertical section taken along line V—V in Fig. 4, Fig. 6 a horizontal cross section with parts in elevation along line VI—VI in Fig. 1, Fig. 7 a cross section with parts in elevation along line VII—VII in Fig. 1, Fig. 8 a vertical cross section on a larger scale, with parts in elevation, through the injection cylinder, Fig. 9 a cross section with parts in elevation along line IX—IX in Fig. 8, Fig. 10 a cross section with parts in elevation taken along line X—X in Fig. 8, Fig. 11 is an enlarged vertical cross section through parts of the closed mold sections, Fig. 12 a vertical cross section with parts in elevation through a modification of the injection cylinder, Fig. 13 an elevation partly in section through a modification of the mounting of several injection cylinders, Fig. 14 a plan view partly in section along line XIV—XIV in Fig. 13, Fig. 15 a plan view and Fig. 16 a vertical cross section along line XVI—XVI in Fig. 15 of a stripping ring used for the injection plunger in Fig. 1, and Figs. 17 and 18 in vertical cross section modifications of the pressure device for clamping the mold sections.

Identical reference numbers in different figures indicate similar parts.

Referring to Fig. 1, 10 is a horizontal base plate, on which vertical columns or tie-rods 11, 12 are mounted. In this exemplification of the invention, the columns consist of tubes for the purpose to be described later on. It should be understood that instead solid rods can be used, or any cast or forged uprights integral with or connected in any suitable way with the base plate 10 to form the frame of the machine.

A clamping plate 13 is fixedly or adjustably mounted on tubes 11, 12 by means of screws 14, 15. Instead, lugs can be provided on plate 13 through which uprights 11, 12 pass, an abutment on the uprights below the lugs and a nut screwed on the uprights from above onto the lugs, or other well known means for holding plate 13 firmly in position.

A mold section 16 is secured to the stationary clamping plate 13 in an exchangeable manner, e. g. by means of a suitable number of bolts 17 the heads of which are positioned in recesses 18 of mold section 16. Mold cavity parts 20 of any desired shape are provided in mold section 16 and connected through influx channels 21 with an influx opening 22 on top of mold section 16 and positioned within a cylindrical bore 23 of clamping plate 13.

Another mold section 24 is provided with the complementary parts 25 of the mold cavities, individually aligned with the cavity parts 20.

Mold section 24 is removably mounted on a piston or plate 26 in a similar way as section 16 on clamping plate 13, e. g. by bolts (not shown).

Piston or plate 26 of sufficient strength substitutes the second clamping plate as heretofore used in machines of this type. Piston 26 is arranged within and liquid-tightly contacts the upper cylindrical portion 28 of a vessel 27 which is preferably semispherical. If the height of the circumferential running surface of piston 26 contacting portion 28 does not suffice for properly guiding the piston and to prevent jamming, the running surface can be elongated by cylindrical projections provided on top and/or bottom of the piston. Piston 26 and the cylindrical inside surface of portion 28 are either ground exactly to measure, as is assumed in Fig. 1, or piston 26 may be provided with elastic piston rings for this purpose. Instead and as shown in Fig. 17, portion 28 and piston 26 may be provided with circumferential grooves 29 and 30, respectively, and the edges of a cuff 31 of leather or any other suitable resilient material liquid-tightly clamped into those grooves. It is also possible to liquid-tightly fasten, e. g. weld a resilient metal membrane 34 to the inside portion 28, as shown in Fig. 18, to mount a clamping plate 35 on the membrane and to connect therewith removably mold section 24.

Vessel 27 and piston 26 or membrane 34 are preferably operated by means of a non-compressible fluid though also a gaseous fluid could be used. Their function is principally hydraulic, and they will be referred to hereinafter and in the appended claims as "hydraulic means."

Lugs 36, Figs. 1 to 5, are arranged on the outside of portion 28 and provided with cylindrical holes 37.

Each hole 37 is provided with two sets of projections 38, arranged opposite to one another, each set covering a little less than 90°. Bolts or pins 39 are rotatably mounted coaxially with the cylindrical holes 37 in clamping plate 13. The bolts or pins 39 project downwardly and upwardly beyond plate 13, and their downwardly projecting portions are each provided with two sets of projections 40 at opposite sides, each of the projections covering a little less than 90°. The projections 38 and 40 are so arranged that upon pushing lugs 36 over the downwardly projecting portions of pins 39, the projecting sets 40 pass the spaces between the projecting sets 38, and upon subsequent turning the bolts or pins 39 about 90°, each projection 40 passes under and contacts and juxtaposes projections 38, thus effecting a multiple bayonet connection of great strength.

It will be appreciated that the position of piston 26 relative to vessel 27 depends on the volume of liquid contained in the latter which is kept as constant as possible by means of device 64. The latter is connected through tube 65 and return valve 66 with the space inside vessel 27. If some liquid leaks out between piston 26 and cylindrical portion 28 of vessel 27, a corresponding amount of liquid is supplied from vessel 64, either by actuating the piston shown on top of the liquid in that vessel, or by the action of a weight or spring resting on that piston. Thus, when vessel 27 is being lifted into its uppermost position, piston 26 will always have a definite position relative to that vessel.

On piston 26 and clamping plate 13 exchangeable mold sections are mounted the thicknesses of which vary. Therefore, if vessel 27 and piston 26 are lifted, they will stop at various distances from clamping plate 13. The minimum combined thicknesses of mold sections 16 and 24 determine the uppermost position of piston 26 and its minimum distance from clamping plate 13. Projections or flanges 40 and cooperating projections 38 should be arranged in such a manner that all the flanges 40 engage all of the projections 38 when piston 26 and thereby vessel 27 and portion 28 are stopped in their uppermost position, as defined above. If the mold sections are thicker, only a part of flanges 40 can engage a corresponding part of projections 38. The number of those projections and their surface areas should be such that they in any event can safely sustain the pressures exerted upon them during operation in any relative position of the hydraulic pressure means relative to clamping plate 13.

The number of relative positions of the hydraulic pressure means relative to clamping plate 13 corresponds obviously to the number of levels in which flanges 40 are arranged on pins 39. If the combined thicknesses of the cooperating mold sections require a position of the hydraulic means relative to clamping plate 13 intermediate between those levels determined by the number of flanges, metal sheets can be inserted between a mold section and the clamping plate and/or a mold section and piston 26 so as to compensate for lack of thickness. It will be appreciated however that there is no necessity for the mold sections to contact each other in any of the relative positions of the hydraulic pressure means and clamping plate 13; as will be seen later on when the operation of the invention is described, piston 26 is raised within vessel 27 when pressure is exerted upon the fluid within that vessel whereby the mold sections are brought in contact even if they had been slightly spaced from one another previously.

Instead of arranging flanges 40 and cooperating projections 38 in planes vertical to the axis of pins 39, they can be arranged individually in any other desired plane, such as a helical plane coaxial with the pins 39.

On the upper ends of pins 39 toothed wheels 41 (Fig. 6) are secured which rest upon the upper surface of clamping plate 13. The contacting surfaces of the wheels and clamping plate may be ground so as to minimize friction; lubrication (not shown) can also be provided. Wheels 41 are turned while no load rests on the flanges 40 so that the power required for rotating the wheels and the friction caused thereby are practically negligible.

A ring 43 toothed on its outer periphery 44 is turnably arranged on top of clamping plate 13 and meshes with the toothed wheels 41. Arm 45 is connected or made integral with ring 43 and joined by link 46 with piston rod 47 and piston 48 which is slidably arranged within a cylinder 49. By admitting a fluid under pressure, i. e. oil or air, through tube 50, piston 48 will be moved so as to turn ring 43 a predetermined angle, while by admitting the pressure fluid through tube 51, piston 48 and ring 43 will be returned to their initial position. Suitable abutments 52, 53 may be provided, preferably in an adjustable way, to limit the motion of arm 45.

It will be appreciated that by rotating ring 43 in one or the other direction, all the pins 39 are rotated in unison and their projections 40 either brought in engagement with or disengaged from the projections 38 of lugs 36; in the first case portion 28 and thereby vessel 27 are locked with clamping plate 13.

It will further be appreciated that any of the pins 39 can be pushed upwardly in plate 13 when the mold is open, until uppermost flange 40 contacts the lower surface of plate 13, giving more free access to the bottom of plate 13 for exchanging or cleaning mold section 16. The gears 41 and 43 are disengaged and re-engage in such up- and downward movement of a pin 39.

On the lower side of vessel 27 a cylinder 54 is mounted, the bottom 55 of which is supported by and connected with rod 56 which in turn is secured to piston 57. A pressure cylinder 58 is mounted on base plate 10 and piston 57 slidably arranged in it.

Forks 59, 60 provided on portion 28 slidably engage the uprights 11, 12. Thus vessel 27 is guided on the uprights and also by piston 57 in cylinder 58. Ring shaped bronze bearings of sufficient height and strength sliding on uprights 11, 12 can be rigidly mounted in the forks 59, 60.

In cylinder 54 a piston 61 is arranged on which a pin or rod 62 is mounted which passes through a stuffing box 63 into vessel 27.

A flexible tube 67 is connected on one end with an inlet in the bottom 55 of cylinder 54 and on the other end through a three-way valve 68 and an adjustable reduction valve 69 with the hollow space in tube 12.

Cylinder 58 is open on the top and connected near its bottom through tube 70, three-way valve 71 and tube 72 with a source of fluid under pressure which may be the same as used for actuating e. g. piston 61.

Above bore 23 of clamping plate 13 an injection cylinder 73 is arranged having a bottom 74 shaped to form a nozzle 75. The injection cylinder is mounted in an arm 76 which is rotatable and slidable on upright or tube 11.

Figure 8:
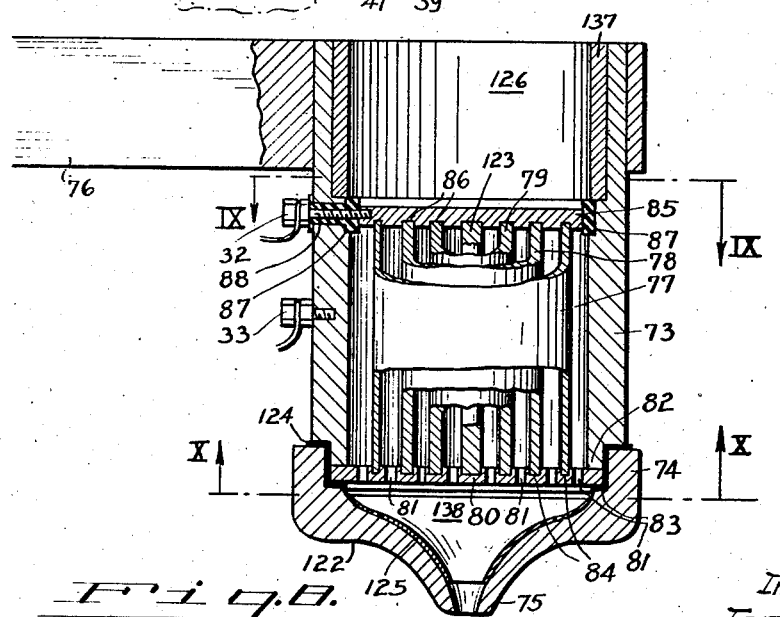
Figures 9, 10:
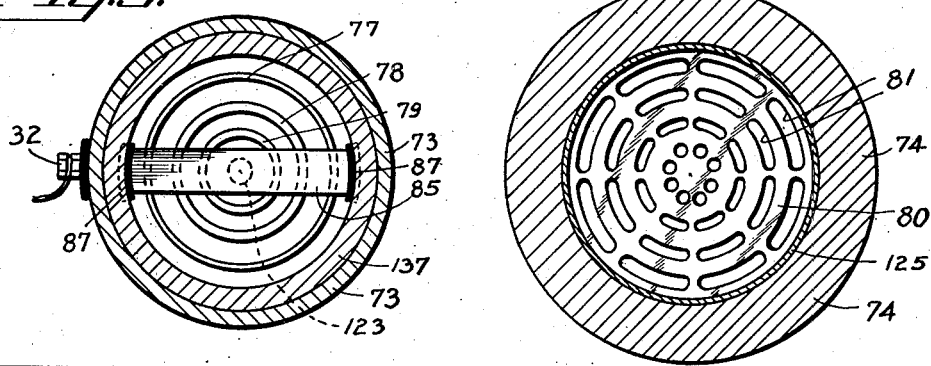

The injection cylinder serves the purpose of heating a charge of moldable material to plasticising temperature and discharging the plasticised material under pressure into the mold cavities. For this purpose, injection cylinder 73, Figs. 8 to 10, is provided with an upper space 126 within lining 137 for receiving a charge of powdery moldable material, such as thermoplastic material of the kind referred to above, and into which fits injection plunger 90. Space 126 may be surrounded by an outside cooling jacket (not shown).

Below space 126 a heating zone for the moldable material is arranged. According to the invention, this zone is formed by a structure easily disassembled for cleaning purposes and comprising a number of tubes 77, 78 and 79 which in this exemplification of the invention are arranged coaxially with a center piece 123. The tubes and center pieces are used as heating elements and engage at their lower ends circular recesses 84 formed in a bottom plate 80 which is clamped between the reduced end 82 of cylinder 73 and a circular seat 83 formed inside bottom piece 74. A cross bar 85 is arranged on top of the tubes and center piece and provided with recesses 86 engaged by the upper ends of those tubes and center piece. The cross bar is insulated from cylinder 73 by insulating washers 87, e. g. of mica. Conductor 88 provided with terminal 32 on its outer end passes insulatingly through cylinder 73 and is electrically connected with cross bar 85. Another terminal 33 is connected with cylinder 73 at any suitable place. Preferably bottom piece 74 is insulated from cylinder 73 by means of a circular insulation 124.

It will be appreciated that by connecting a source of electrical current (not shown) with terminals 32, 33, electric current will be passed through cross bar 85 and in parallel through the tubes and center piece engaging the former, and through bottom plate 80 to cylinder 73. By suitably dimensioning the cross sections of the heating elements formed by the tubes and center piece and properly choosing the conductive material of which they are made, furthermore by adjusting the voltage of the electric current applied to terminal 32, 33, it is possible to heat the tubes and center piece individually to any desired temperature. In particular, the temperatures of the tubes and center piece can be made equal, or staggered so as to increase from the outside to the inside or vice versa. The current also passes cylinder 73 and heats it to a temperature which is determined by the cross section, height and material of the cylinder and the voltage acting upon cylinder 73 which is electrically connected in series with the bottom plate, the tubes and center piece, and the cross bar. By heating cylinder 73 in the way described or in any other way, obvious to anybody skilled in the art, inevitable losses of heat into the surrounding atmosphere can be compensated for.

It will be further observed that the charge filled into space 126 and forced by the injection plunger entering said space into the spaces between the tubes, the center piece and cylinder 73, is thereby subdivided into circular layers contacting the heating elements over large surface areas and the cross section of which depends upon the distances between the tubes, tube 79 and center piece 123, and tube 77 and cylinder 73. By proper choice of the number of tubes which can be increased or reduced, any desired thickness of those layers can be obtained. The smaller that thickness, the faster will the heat conveyed to the layers from the contacted heated tubes, etc., penetrate into those layers, and the faster will the material of poor heat conductivity comprised by those layers be plasticised. The thinner these layers are, the smaller should be the thermal gradient from the heating elements formed by the tubes, etc. to the material to be plasticised, and the smaller may be the difference between the higher temperature of the heating elements and the final temperature to which the material of the layers is to be heated.

Taking thermoplastic materials as mentioned above, they should be heated to about 320° to 400° F. By proper choice of the thickness of the layer of the material and by making the exposed heat conveying surfaces of the heating elements as large as possible, the temperature of the latter is made higher by only a few degrees than the desired maximum plasticising temperature of the material of the layers. Whereas in injection cylinders of known structure this difference was relatively great and therefore was apt to burn or ruin the material of poor heat conductivity at least in outside strata when contacted by the heating elements for too long a time, this danger is avoided by the structure according to the invention, because the maximum temperature of the heating elements need not exceed the plasticising temperature of the material by more than a few degrees. Consequently the material can also remain in contact with the live heating elements for any period of time without being endangered or ruined.

This effect of the invention can also be obtained with other arrangements of the tubes or heating elements than exemplified in Figs. 8 to 10. Thus, for instance, the tubes can be arranged eccentrically and the material forced through the individual tubes and/or around them. In general any arrangement of heating elements within the heating zone of the injection cylinder covers the idea underlying this invention by which the moldable material of poor heat conductivity passing the heating zone is subdivided into layers or strands of sufficiently small thickness and contacts exposed heat conveying surfaces of such relatively large area that heat can quickly penetrate into the layers and substantially uniformly heat them to the desired plasticising temperature, without overheating or ruining outside strata even if the material is exposed to such heat for a long time.

Bottom plate 80 is provided with a suitable number of oblong or circular holes 81 as large and wide as possible to allow the plasticised material to pass into space 138 within bottom piece 74.

In order to avoid undesired cooling of the plasticised material in space 138, the latter may also be heated. To this effect a lining 125 of electrically conductive material of desired composition may be placed on and insulated from the inside surface of bottom piece 74, and electrical terminals (not shown) connected with the lining on opposite sides thereof. Electric current from the same source (not shown) as applied to the terminals 32, 33 may also be fed through flexible conductors to lining 125 and the latter thereby heated to a desired temperature, in general equalling or by a few degrees exceeding the plasticising temperature of the material forced into space 138. It should be understood that the metallic bottom piece 74 could be used as a heating element, if desired, and lining 125 then be omitted.

There is also provided a container or hopper 91, Fig. 1, for a supply of moldable material to be fed through connecting tube or channel 92 into the space 126 within lining 137 of the cylinder above cross bar 85. Inside hopper 91 feeding means, such as a propeller, are provided and driven intermittently, e. g. by an electromotor, in order to feed predetermined and preferably adjustable amounts of moldable material into the cylinder space 126. These feeding means, their drive and timed control are conventional and therefore not shown in the drawing.

Above cylinder 73, Figs. 1 and 2, a plate 93 is arranged and slidably guided on the uprights or tubes 11, 12.

On plate 93 a cylinder 94 is mounted in which piston 95 is reciprocating, which is connected with injection plunger 90.

Cylinder 94 is closed on top by cover 96 which is provided with lugs 97 to which pairs 98 and 99 of toggle links are hinged. The other pairs of links 100 and 101 of each toggle are hinged to lugs 102 and 103, respectively, provided on cross bar 104 which is rigidly connected with the upper ends of tubes 11 and 12.

The spaces of cylinder 94 above and below piston 95 are connected by channels 105, 106 with a three-way valve 107 which in turn is connected with tube 11 by means of a flexible tube 108.

A sleeve 109 is rotatable around tube 11 and rigidly connected with arm 76 and passes through the left-hand hole of plate 93; between the upper end of sleeve 109 and plate 93 a ball bearing 110 is arranged. Thus arm 76 can rotate relative to plate 93 and tube 11, and is taken along by plate 93 when the latter is lifted and lowered.

Figure 7:
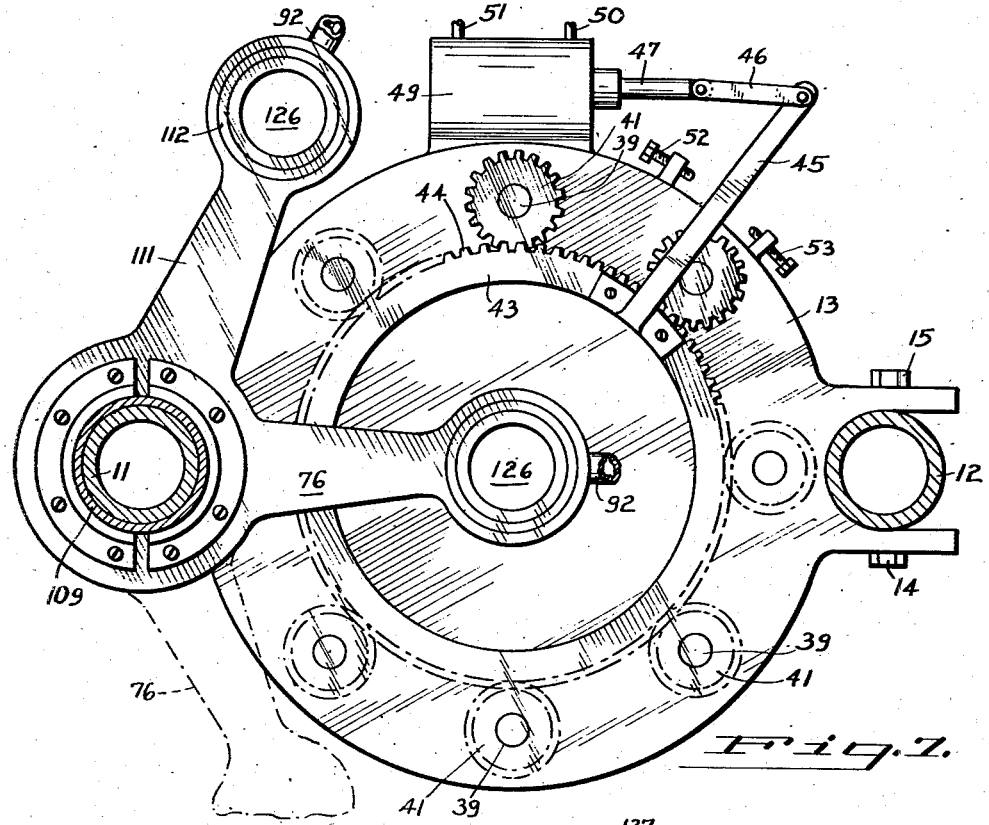

Another arm 111 may be connected with arm 76, as will be seen from Figs. 1, 2 and 7, on which another cylinder 112 preferably similar to cylinder 73 and provided with an injection nozzle 113, is mounted.

Between the joints 115 and 118 of the toggle links 98, 100 and 99, 101, respectively, a mechanism for stretching and breaking the toggles is provided. In the exemplification shown in Fig. 1, a piston rod 114 is hinged to joint 115 and attached at its other end to piston 116 which is slidably arranged within cylinder 117; the latter is hingedly connected with joint 118. By admitting a fluid under pressure in front of piston 116 through tube 119, the toggles are straightened out preferably until joints 115, 118 strike rods 111 and 112, respectively; by admitting fluid under pressure through tube 120, the toggles are broken. The mechanism and their timed control for alternatingly admitting fluid under pressure to one of the sides of piston 116 and for releasing fluid simultaneously at its other side, are conventional and therefore not shown in the drawing.

Fluid under pressure such as oil is continuously maintained in tubes 11, 12 by means of a pump 124.

This apparatus operates in the following way:

At the start of a cycle the mold is open and mold section 24 within vessel 27, cylinder 54 and piston 57 are in their lower-most position. Injection cylinder 73 with nozzle 75, plate 93, injection plunger 90 and its driving piston 95, and cylinder 94 are in their uppermost position, as shown in Fig. 1.

Now a fluid under pressure, such as oil or compressed air, is admitted through valve 71 into cylinder 58 and thereby piston 57, cylinder 54 and vessel 27 are lifted as close as possible to clamping plate 13, as described above in more detail.

The area of piston 57 and the pressure in the fluid admitted to cylinder 58 are so measured that the weight resting on piston 57 is lifted quickly. It should be observed, however, that no clamping pressure is to be exerted by piston 57 at any time, and consequently the area of piston 57 and/or the pressure in the fluid can be relatively small; just sufficient to raise the weight resting on piston 57 within a desired period of time.

Now fluid under pressure, such as oil, or compressed air, is admitted through tube 50, Figs. 1, 2 and 6, to cylinder 49 and piston 48 completes its forward stroke quickly, thereby turning the toothed ring 48 and all the bolts 39 simultaneously a little more than 90°. Thereby the projecting flanges 40 on bolts 39 are turned into the recesses between projections 38 in lugs 36 arranged on the outside of upper portion 28 of vessel 27 (Figs. 1, 2 and 6), and lock vessel 27 to clamping plate 13. It should be observed that this locking motion is effected while no clamping pressure is yet exerted upon the mold sections 16, 25; consequently little power is needed for rotating ring 46 and bolts 39 and very little wear of the cooperating parts is caused.

After vessel 27 and clamping plate 13 have been thus locked, fluid under pressure, such as oil, is admitted through valve 68 and tube 67 to the lower side of piston 61 in cylinder 54, raises the piston and thereby the rod or pin 62. The latter is pushed into vessel 27 which is filled with a suitable preferably non-compressible fluid, such as oil, and displaces the latter to the effect of exerting a pressure upon piston or plate 26 and thereby on mold section 24 mounted thereon, resulting in the desired clamping pressure between mold sections 24 and 16.

It will be appreciated that the pressure exerted upon the unit of area of plate or piston 26 depends upon the displacement of the oil in vessel 27 by the pushed-in pin 62. The latter is cylindrical with a horizontal top, and it is evident that the pressure for pushing in the pin depends upon the area of this horizontal top and its relation to the pressed upon area of piston 61, while any pressure exerted upon the cylindrical circumference of the portion of pin 62 projected into vessel 27 is balanced in itself. From this it appears that relatively high pressure upon the total area of piston or plate 26 can be exerted by relatively small pressures upon the lower side of piston 61 connected with pin 62. Due to the fact that the pressure exerted by pin 62 upon the fluid in vessel 27 is equally distributed to all sides through the non-compressible fluid, any desired total pressure can be exerted upon piston or plate 26 and thereby mold section 24 in order to tightly clamp mold sections 16 and 24 and to prevent flashes.

It will be observed that vessel 27 due to its preferred semispherical shape will be capable of withstanding most effectively the pressure eexrted upon it by the non-compressible fluid when pin 62 is pushed into the latter. It will be further appreciated that the reaction forces resulting from the pressure exerted upon mold section 16 are conveyed to vessel 27, hence to lugs 36 and flanges 40 engaging the projections in those lugs, hence to bolts 39 and toothed wheels 41 resting upon the upper side of clamping plate 13. No reaction forces are, however, conveyed to base plate 10 or tie rods 11, 12. Cylinder 54 is rigidly mounted on vessel 27 and the pressure of the fluid introduced into cylinder 54 below piston 61 acts solely between the latter, the cylinder 54 and its bottom 55.

No reaction forces resulting from the clamping pressure are conveyed either to piston 57 and cylinder 58, thus completely relieving the frame structure of the machine of any positive or reaction forces bringing about the desired clamping pressure between the mold sections.

Although a semispherical or cup-like shape of vessel 27 is preferred, any other conventional shape of the vessel could be used, e. g. an ordinary cylinder having a bottom attached thereto.

Lowering of plate 93 is effected by admitting fluid under pressure, such as oil or compressed air, through tube 118 into cylinder 117 in front of piston 116. Thereby the toggles 98, 100 and 99, 101 are stretched and cylinder 94 together with plate 93 lowered to their lowermost position. Simultaneously arm 76 connected with plate 93 by sleeve 109, is also lowered and cylinder 73 moves into hole 23 of clamping plate 13. The toggles are dimensioned so that in their stretched position nozzle 75 is pressed into inlet 22. In order to avoid excessive pressure between the contacting surfaces of the nozzle and the inlet, preferably resilient abutments 121 are provided on the side wall of opening 23, on which the shoulder 122 of the bottom piece 74 of cylinder 73 comes to rest.

According to the invention either one and the same injection cylinder 73 is used in subsequent cycles, or two or more such injection cylinders are used alternatively, or in predetermined rotation. In any case, at any time after injection plunger 90 has been withdrawn from space 126 of the injection cylinder, and before the injection plunger enters again that space in its injection stroke, a new charge of powdery moldable material is to be fed into space 126. For this purpose, a propeller or other feeding means within hopper or container 91 associated with that space 126 is operated for a predetermined time so as to feed a measured quantity or charge of powdery moldable material into that space. This can be done by switching in and out an electric motor for driving the propeller at preferably adjustable speed for a preferably adjustable period of time, as is well known in the art and need not be described in detail.

While vessel 27 is being locked to clamping plate 13 by turning the bolts 39 and immediately thereafter pressure is applied to plate 26 so as to tightly clamp mold section 24 against mold section 16, fluid under pressure, such as oil, is admitted through valve 107 into cylinder 94 above piston 95, so that the latter is pressed downwardly and moves injection plunger 90 into the space 126 of cylinder 73. Thus plunger 90 starts to compress the new powdery material filled into space 126 just after the mold sections have been clamped together and nozzle 75 has been pressed into inlet 22. Thereby the new material is forced into the space between the heating element formed by the concentrical rings 77 to 79 and the center piece 123 and forces out and downwardly in those spaces the material which was pressed into them during a foregoing cycle, and has been heated and completely plasticised since. Depending upon the total quantity of material to be injected into the mold cavities, either almost the entire amount of previously plasticised material within those ring spaces or heating zone will be thus injected into the mold cavities, or only part of it; if an extremely large quantity of material is to be injected, also part of the new material just previously fed into space 126 may thus be injected after having passed the heating zone and being thus plasticised.

As pointed out above, the temperatures to which the heating elements 72 to 79 and 123, also cylinder 73 and bottom piece 74 and its lining 125, if any, are heated can be adjusted so as to avoid any danger of overheating plasticized material within the heating zone of the injection cylinder and its nozzle, and they both actually work as means for plasticising the charge or charges and storing the plasticized charge at proper temperature for any subsequent use.

It will further be appreciated that the idle up and down motion of injection cylinder 73 is due to the particular object and feature of the invention that exchangeable injection cylinders are used. If this object is not to be answered, cylinder 73 can permanently be kept in its lowermost position by the stretched toggles.

Instead of the hydraulic apparatus 114 to 117, any other well known means for stretching and breaking the toggles can be used, such as an electromagnet, a reversible electromotor, and even manual operation is possible, as well known in the art and therefore not to be described and shown in detail.

In any case, the power required for actuating the toggles or other lifting and lowering means used instead, is relatively small and results in little wear of the mechanisms.

The injection proper for which relatively great force is to be exerted upon the moldable and plasticized material, is produced by injection piston 90 which is actuated by a source of energy and means other than those operating the toggles or other means for lowering and lifting the injection cylinder.

As indicated in Fig. 5, a plurality of injection cylinders 73 may be arranged turnable around upright 11. Each cylinder is provided with an individual feeding means and thus material either of the same or of different kinds can be fed into the various cylinders. If an excessive amount of material is to be injected into the mold cavities, and plasticizing of material fed into space 126 is not sufficient, or if parts of the space of the cavities is to be filled first with one kind of material and thereafter their remaining space with another kind of material, the following method is used. Cylinder 73 is withdrawn after the amount of plasticised material contained therein is injected to fill part of the cavity spaces, by lifting plate 93 and the parts connected therewith; plunger 90 is simultaneously moved upwardly by admitting fluid under pressure through valve 107 and tube 106 below piston 95 and releasing the fluid above the piston through tube 105; another cylinder 112 is swung in alignment with inlet 22 and lowered into injection position, and plunger 90 is caused to perform another injection stroke, thus filling the remaining part of the cavity spaces.

The plasticised material injected into the cavities rapidly cools and shrinks, until it is cooled below the temperatures corresponding to its temperature distortion point. Plunger 90 is kept under pressure until additional plasticised material compensating for such shrinkage is injected into the mold cavities and the plastic material completely filling the mold cavities has cooled below its temperature distortion point.

It will be appreciated that while this high pressure rests on the material within the cavities and tends to separate the mold sections, any such separation is counteracted by the high clamping pressure produced within vessel 27 by pin 62 in its uppermost position and translated to the mold sections. Relatively little force is to be exerted upon piston 61 to maintain this high pressure, the reaction forces of which are translated by lugs 36 and bolts 39 directly to clamping plate 13, thus relieving the frame structure from almost all such reaction forces.

In order to further reduce and more equally distribute the total clamping pressure required, the contacting surface areas of the mold sections should be reduced as far as possible. To this effect, the individual cavities of at least one of the mold sections end in projecting rims 152 and/or 133, Fig. 11, the contacting surface areas of those rims being as small as the compression strength of the material of the sections safely permits, while the adjacent areas 153 are somewhat withdrawn.

The reaction forces caused by operating the injection plunger acting through the charge in space 126 upon the plasticised material and the exposed upper surface of rings 77 to 79 and cross bar 85, are translated through inlet 22 upon mold section 16 and in part through the resilient abutments 121 upon clamping plate 13, and the latter translates them to the uprights 11, 12 to which the toggles are hinged which keep cylinder 94 in place during injection proper. By subdividing the plasticised material into layers or strips of relatively great vertical height compared with their horizontal areas, it is possible to reduce the latter considerably. In the same way the exposed upper surface areas of the heating elements and cross bar 85 can be reduced to a relatively small size (and rounded off (streamlined)). Thereby also the horizontal area of plunger 90 can be reduced to a minimum size. Due to the effective and rapid heating of the subdivided layers or strips, they plasticise quickly and their friction on the heating elements and otherwise is considerably reduced, so that the force for operating the plunger is also relatively small, resulting in equally small reaction forces to be translated through the uprights 11, 12. The latter and all the other portions of the structure can be made therefore relatively light in weight, resulting in a lighter and less expensive apparatus than heretofore known.

Cooling of the injected material is effected by the relatively large masses of the metallic mold sections. If faster cooling is desired, channels carrying a cooling medium can be arranged in the mold sections, as is well known in the art. Fig. 11 indicates such cooling channels 154. As cooling medium faucet water or artificially cooled water, or a refrigerant, such as a refrigerated brine, can be used in order to shorten the cooling period.

After the injected material is cooled and solidified the fluid under pressure below piston 61 is released through valve 68, and piston 61 lowered immediately by action of gravity. If desired, fluid under pressure can be admitted above piston 61 to accelerate its downward movement. Thereby the pressure on the fluid within vessel 27 is released instantaneously, and mold section 24 separates slightly from mold section 16 by action of gravity upon mold section 24 and piston 26. It should also be considered that by withdrawing pin 62, the upper level of the fluid within vessel 27 retreats from plate 26, causing a kind of vacuum below the plate whereby the atmospheric pressure resting on plate 26 comes into play, assisting separation of the mold sections and lowering of plate 26 upon the retreated level of the fluid in vessel 27.

If for one reason or the other the mold sections stick together, additional power means can be provided to separate them.

After the clamping pressure has been released in the way just described, fluid under pressure is admitted through tube 51 into cylinder 49 in front of piston 48, while the fluid at the other side of piston 48 is released through the tube 50. Thereby piston 48 returns into its initial position and rotates ring 48 and thereby bolts 39 so as to disengage the flanges 40 from the projections 38.

It will be appreciated that this return rotation of the pins and flanges and wheels connected therewith, is performed while they do not carry any substantial load hence negligible friction results and the power required for effecting this return movement is consequently small.

As soon as the lock between clamping plate 13 and vessel 27 is thus removed, vessel 27 with all the other parts connected therewith moves downwards under the action of gravity. To this end, the fluid under pressure, admitted to cylinder 58 for lifting vesesl 27, etc., is released through valve 71 when flanges 40 are completely disengaged from projections 38. Though the weight of vessel 27 and the parts connected therewith will suffice for its prompt and fast lowering and this may be assisted, if desired, by providing a closure for the top of cylinder 58 and admitting fluid under pressure into the latter above piston 57 in its uppermost position. This is understood by anybody skilled in the art and therefore does not need detailed showing in the drawings.

As can be seen from Fig. 1, the inlet of tube 70 in cylinder 58 is arranged at some distance from and above the bottom of the cylinder. As soon as piston 57 on its downward stroke passes below the inlet opening, the air in the cylinder below piston 57 will be compressed and act like a cushion in decelerating and finally stopping piston 57 with all the parts connected therewith.

As soon as the material injected into the mold cavities is solidified, piston 95 can be raised by admitting fluid under pressure through valve 107 and tube 106 and releasing the fluid on the other side of piston 95 through tube 105 and three-way valve 107. Thereby injection plunger 90 is withdrawn into its upper position. Simultaneously with or immediately following this withdrawal of plunger 90, fluid under pressure is admitted through tube 120 into cylinder 117 and fluid released from that cylinder through tube 119, whereby the toggles are broken and cylinder 94, plate 93, arm 76 and cylinder 73 lifted to their uppermost position.

If an exchange of cylinder 73 by cylinder 112 is desired, arms 76 and 111 can now be swung around upright 11.

Thereby a cycle of operation of the machine is completed, the mold is open and the molded and solidified articles can be removed by ejecting and stripping-off means well known in the art.

It will be appreciated that exchange of mold sections can now be easily performed because preferably only two uprights are used as illustrated, leaving free and wide access to the mold sections from both sides of the machine.

In order to effect ejection, it is preferred to use a compressed fluid, such as air. To this effect, the mold cavity in which the molded solidified article lies after the mold sections are separated, is provided with a bore 127, Figs. 1 and 11, ending in an oblique seat 128. Within the bore, a ring 129 provided with a great number of perforations 130 is arranged through the center bore of which stem 131 of a valve passes; the head 132 of the valve is seated on seat 128 and provided with an outer exposed surface completing the shape of the mold cavity 25. A collar 134 is provided at the lower end of stem 131 and a helical tension spring 135 is arranged between the collar and plate 129, tending to keep head 132 seated.

A channel 136 in mold section 24 opens into the bore 127 below ring 130. It should be understood that all the cavities in mold section 24 are provided with ejection means of the same type, and channel 136 branches off to all the bores of those ejecting means. A fluid under pressure, such as air, is supplied through a flexible tube to channel 136.

As soon as an article is molded and solidified, and the mold sections are separated, compressed air is admitted through channel 136 to bore 127, acts upon the lower side of head 132 and raises the latter, whereby it is permitted to penetrate between the lower side of head 132 and the seat 128 into the mold cavity. By raising head 132 and the subsequent influx of air under pressure into the mold cavity, the article contained therein is lifted and thrown out. It can now be removed by stripping means well known in the art. Since the invention is not confined to vertical machines but can equally be applied to, e. g. horizontal machines, it will be appreciated that in the latter case the thus thrown-out articles will fall downwardly out of the machine by action of gravity and no stripping means are needed.

Figure 12:
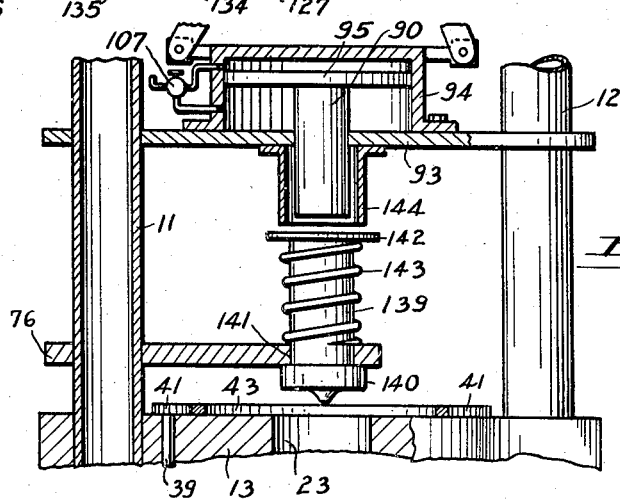

It is within the object of the invention to reduce heavy moving masses, and therefore a movable injection cylinder may be subdivided in the way shown in Fig. 12. Arm 76 is assumed as fixedly connected with upright 11, and an injection cylinder 139 with nozzle 140 and provided with heating elements inside as described above, is movably held in a bore 141 of arm 76. Cylinder 139 is provided with a collar 142, and a helical tension spring 143 tends to keep cylinder 139 in its uppermost position.

The injection plunger 90 projecting from cylinder 94 through plate 93, is surrounded by a sleeve 144.

In operation, cylinder 94 and plate 93 are lowered the same way as described with reference to Figs. 1 and 2. Thereby sleeve 144 strikes collar 142 and presses the latter together with cylinder 139 downwardly against the action of spring 143 until nozzle 140 is in its lowermost position within bore 123 of the stationary clamping plate 13. Thereafter injection plunger 90 is operated downwards the same way as described above, enters the upper space of cylinder 139 and injects the plasticized material contained therein through nozzle 140.

New material can be fed into cylinder 139 by an individual feeding means of the type and arranged in the same way as hopper 91 shown in Fig. 1; for simplicity's sake. Those feeding means are omitted in Fig. 12.

It is also possible to arrange a plurality of injection cylinders 139, 139' on a slide 145, as shown in Figs. 13 and 14. The slide is movable on cross bars 146, 147 fixedly mounted on the uprights 11, 12. While one cylinder, e. g. 139, is in alignment with bore 23, the other one, e. g. 139' is moved sidewardly. Thus it is possible to feed material into cylinder 139' from a hopper 91 through discharging chute 148. Another feeding means 91', 148' can be arranged on the other side, as shown in Figs. 13, 14, containing the same or a different kind of material than hopper 91.

With this arrangement, injection plunger 90 will inject the material filled into cylinder 139 in its position shown in Fig. 13, while new material is fed simultaneously into cylinder 139'. After the cycle is completed, and plunger 90 withdrawn, slide 145 is moved to the right side in the drawings, so that cylinder 139 comes under chute 148' and the filled cylinder 139' under plunger 90. In the next following cycle the material contained in cylinder 139' is injected by plunger 90, while cylinder 139 is filled with a pre-measured quantity of moldable material from hopper 91'.

When plunger 90 is withdrawn from space 126, Figs. 1 and 6, material adhering to its circumference should be stripped off. To this effect a stripping ring can be provided as shown in Figs. 15, 16. The ring is composed of a plurality of sectors 149 contacting with their inner circular surfaces the plunger 90 and being pressed against it by means of a circular compression spring 150. An L-shaped ring 151 is mounted on the upper end of cylinder 73 and covers the spring ring 150 and part of the upper side of sector 149. Ring 151 is preferably somewhat spaced from the spring and sectors and merely serves to prevent their falling off from cylinder 73.

It should be understood that the supply of oil or like fluid under pressure through the hollow pillars 11, 12 is only a preferred feature of the invention. Instead any separate tube or conduit can be arranged.

It should also be understood that timed turning or moving of arms 76, 111 and slide 145 can be effected by power means such as described and shown for turning ring 48 or actuating the toggles.

It should be further understood that timed and preferably adjustable actuation of valves 68, 71 and 107, and of the valves or other means for admitting and releasing fluid under pressure to cylinders 49 and 117 as well as admitting fluid under pressure to channel 136, furthermore intermittent actuation of the power driven means for feeding the powdery moldable material into the spaces 126 and shifting arms 76 and 111, can be effected by automatic control means, such as well known and therefore not shown, electrical timing arrangements comprising e. g. one or more preferably exchangeable cams on a motor driven shaft. The speed of the shaft can be adjusted, and each complete revolution of it corresponds to one cycle of the machine. The cam or cams are shaped so that rollers contacting the cam surface are raised or lowered at certain moments and close and open, respectively, circuits for electromagnetic relays or motors which in turn actuate an associate valve or other controlling element, turn an arm 76, move a slide 145, etc.

By adjusting reduction valve 69 the total clamping pressure exerted by the hydraulic pressure means can be regulated so as to meet the requirements of each individual case which improves the efficiency of the invention.

If powdery moldable material is fed into the open end of an injection cylinder after the injection plunger has been completely withdrawn, as illustrated in Figs. 13 and 14, feeding chutes of considerably larger cross section than shown can be used, and it should be understood that also with arrangements as shown in Figs. 1 and 2 and even with a single or stationary injection cylinder this method of feeding fresh material into the open end of an injection cylinder can be applied to advantage.

Instead of passing the heating current through tubes 77 to 79, etc., in Figs. 8, 9, separate heating elements can be associated with the latter, or a coil carrying an alternating and particularly high frequency current arranged around and outside of cylinder 73, to effect induction heating of the latter and the tubes whereby electrical insulations within the cylinder and for leading-in conductors can be dispensed with.

The separate power driven means 57, 58 for reciprocating the hydraulic pressure means 26, 27, operate obviously and advantageously with relatively small power over a long stroke while the hydraulic means operate with relatively great power over a very short stroke of plate 26, and the latter will hardly move at all when pressure is applied to it.

It should be understood that the invention is not limited to any particular exemplification herein described but to be defined in its broadest aspects by the appended claims.

What I claim is:

1. An injection molding machine comprising, in combination, a stationary clamping plate provided with an injection channel, a reciprocating clamping plate at one side of said first plate, cooperating mold sections between said plates, one of said sections associated with said first plate and communicating with said injection channel and the other one associated with said second plate, compression means associated with the reciprocating plate, a member movable to and from the side of the first plate opposite from the reciprocating plate, power means for moving the member toward and from the first plate, a plunger slidably mounted on the member, a second power means mounted on the member to cause the plunger to reciprocate toward and from the first plate, an arm pivoted on the member and an injection cylinder on the arm for movement into registry between the plunger and the first plate.

2. An injection molding machine comprising, in combination, a stationary clamping plate provided with an injection channel, a reciprocating clamping plate at one side of said first plate, cooperating mold sections between said plates, one of said sections associated with said first plate and communicating with said injection channel and the other one associated with said second plate, compression means associated with the reciprocating plate, an injection cylinder and cooperating injection plunger mounted for conjoint sliding movement toward and from the opposite side of said first plate, said cylinder comprising a space for receiving moldable material, an injection nozzle and a heating zone in between, a pivoted arm for supporting said cylinder relative to said first plate in various positions including that in which said nozzle communicates with said injection channel, said heating zone formed substantially by electrical heating elements within and extending substantially coaxially with said movable cylinder and comprised of removable tubes substantially coaxial with said movable cylinder so as to form narrow passages of large surface development communicating with said space and nozzle.

3. In an injection molding machine as described in claim 2, a perforated plate on one end and a member exemplified by a crossbar at the other end of said heating zone, said heating elements held in place by said plate and member within said heating zone.

4. An injection molding machine substantially comprising, in combination, a stationary clamping plate provided with an injection channel, a second reciprocating clamping plate at one side of said first plate, cooperating mold sections between said plates, one of said sections associated with said first plate and communicating with said injection channel and the other one associated with said second plate, compression means associated with the reciprocating plate, at least one injection cylinder having an injection nozzle and a cooperating injection plunger at the side of said first plate opposite said reciprocating plate, said injection cylinder being arranged to be moved laterally relative to said first plate and injection plunger into various positions in one of which said nozzle communicates with said injection channel, said plunger arranged to reciprocate in a path aligned with said injection channel and said movable injection cylinder in its said communicating position so as to enter and completely leave said cylinder.

5. In an injection molding machine as defined in claim 4, means for reciprocating said injection plunger toward and from said clamping plates and turning means for said movable injection cylinder comprising an arm supporting said cylinder and oscillatably carried by said plunger reciprocating means.

6. An injection molding machine comprising in combination, a fixed clamping plate provided with an injection channel, a movable clamping plate mounted adjacent said first plate, cooperating mold sections between said plates, one of said sections being associated with the fixed plate and communicating with said injection channel, compression means associated with the movable plate, a member movable to and from the outer side of the first plate, power means for moving the member toward and from the first plate, a plunger slidably mounted on the member, a second power means mounted on the member to cause the plunger to reciprocate toward and from the first plate, an arm pivoted on the member, an injection cylinder on the arm, a nozzle on the cylinder for registration with said injection channel in advance of the plunger, said plunger being adapted to enter the rear end of the cylinder on its advancing stroke and to leave the cylinder on its return stroke, and means for feeding moldable material into the open end of the cylinder when the arm is swung away from the plunger.

FRITZ VON OPEL.